US010374227B2

(12) United States Patent
Lee et al.

(10) Patent No.: US 10,374,227 B2
(45) Date of Patent: Aug. 6, 2019

(54) POSITIVE ELECTRODE ACTIVE MATERIAL, METHOD FOR PREPARING THE SAME AND LITHIUM SECONDARY BATTERY INCLUDING THE SAME

(71) Applicant: LG Chem, Ltd., Seoul (KR)

(72) Inventors: Dong Kwon Lee, Daejeon (KR); Seung Beom Cho, Daejeon (KR); Jun Seok Nho, Daejeon (KR); Byung Hyun Min, Daejeon (KR); Bae Jung Kim, Daejeon (KR)

(73) Assignee: LG Chem, Ltd. (KR)

( * ) Notice: Subject to any disclaimer, the term of this patent is extended or adjusted under 35 U.S.C. 154(b) by 40 days.

(21) Appl. No.: 15/531,107

(22) PCT Filed: Dec. 4, 2015

(86) PCT No.: PCT/KR2015/013267
§ 371 (c)(1),
(2) Date: May 26, 2017

(87) PCT Pub. No.: WO2016/089177
PCT Pub. Date: Jun. 9, 2016

(65) Prior Publication Data
US 2017/0324084 A1    Nov. 9, 2017

(30) Foreign Application Priority Data

Dec. 5, 2014   (KR) .................... 10-2014-0174080
Dec. 4, 2015   (KR) .................... 10-2015-0172360

(51) Int. Cl.
*H01M 4/36*       (2006.01)
*H01M 4/505*      (2010.01)
(Continued)

(52) U.S. Cl.
CPC ............. *H01M 4/366* (2013.01); *B60L 50/64* (2019.02); *C01G 25/00* (2013.01); *C01G 25/006* (2013.01);
(Continued)

(58) Field of Classification Search
CPC .... H01M 4/366; H01M 4/0471; H01M 4/131; H01M 4/1391; H01M 4/505;
(Continued)

(56) References Cited

U.S. PATENT DOCUMENTS 9,972,841 B2 *   5/2018  Kwak .................. H01M 4/483
2008/0160414 A1  7/2008  Jitsugiri et al.
(Continued)

FOREIGN PATENT DOCUMENTS

CN      103563138 A    2/2014
JP      2007191354 A   8/2007
(Continued)

OTHER PUBLICATIONS

Machine translation of JP 2012-138197 (no date).*
(Continued)

*Primary Examiner* — Amanda C. Walke
(74) *Attorney, Agent, or Firm* — Lerner, David, Littenberg, Krumholz & Mentlik, LLP (57) ABSTRACT

The present invention provides a positive electrode active material prepared using a preparation method including mixing lithium complex metal oxide particles with a nanosol of a ceramic-based ion conductor and heat treating the resultant to form a coating layer including the ceramic-based ion conductor on the lithium complex metal oxide particles, thereby forming a coating layer including a ceramic-based ion conductor to a uniform thickness on a lithium complex metal oxide particle surface, and as a result, capable of minimizing capacity decline and enhancing a lifespan prop- (Continued)

erty when used in a secondary battery, a method for preparing the same, and a lithium secondary battery including the same.

18 Claims, 4 Drawing Sheets

(51) Int. Cl.
| | |
|---|---|
| *H01M 4/525* | (2010.01) |
| *H01M 4/62* | (2006.01) |
| *H01M 10/0525* | (2010.01) |
| *C01G 25/00* | (2006.01) |
| *C01G 53/00* | (2006.01) |
| *H01M 4/04* | (2006.01) |
| *H01M 4/131* | (2010.01) |
| *H01M 4/1391* | (2010.01) |
| *B60L 50/64* | (2019.01) |
| *H01M 10/052* | (2010.01) |
| *H01M 4/02* | (2006.01) |

(52) U.S. Cl.
CPC .......... *C01G 53/50* (2013.01); *H01M 4/0471* (2013.01); *H01M 4/131* (2013.01); *H01M 4/1391* (2013.01); *H01M 4/505* (2013.01); *H01M 4/525* (2013.01); *H01M 4/62* (2013.01); *H01M 10/0525* (2013.01); *C01P 2002/72* (2013.01); *C01P 2004/03* (2013.01); *C01P 2004/04* (2013.01); *C01P 2004/61* (2013.01); *C01P 2004/64* (2013.01); *C01P 2004/84* (2013.01); *C01P 2006/40* (2013.01); *H01M 10/052* (2013.01); *H01M 2004/028* (2013.01); *H01M 2220/20* (2013.01); *Y02E 60/122* (2013.01); *Y02T 10/705* (2013.01); *Y02T 10/7011* (2013.01)

(58) Field of Classification Search
CPC ........ H01M 4/525; H01M 4/62; C01G 25/00; C01G 25/006; C01G 53/50
USPC .......................................................... 429/223
See application file for complete search history.

(56) References Cited

U.S. PATENT DOCUMENTS

| | | | |
|---|---|---|---|
| 2009/0186275 A1 | 7/2009 | Exnar et al. | |
| 2011/0274977 A1* | 11/2011 | Nakura | C01G 53/00 429/223 |
| 2012/0276446 A1 | 11/2012 | Kawai | |
| 2014/0079873 A1 | 3/2014 | Miki et al. | |
| 2015/0110951 A1 | 4/2015 | Miki | |
| 2015/0368163 A1* | 12/2015 | Hao | C01G 51/42 501/1 |
| 2017/0288206 A1* | 10/2017 | Lee | H01M 4/131 |

FOREIGN PATENT DOCUMENTS

| | | | |
|---|---|---|---|
| JP | 2009532323 A | | 9/2009 |
| JP | 2012138197 A | | 7/2012 |
| JP | 2012238581 A | | 12/2012 |
| KR | 20060099314 A | * | 9/2006 |
| KR | 100813014 B1 | | 3/2008 |
| KR | 20120012628 A | | 2/2012 |
| KR | 20130016399 A | | 2/2013 |
| WO | 2009151528 A1 | | 12/2009 |
| WO | 2011067898 A1 | | 6/2011 |
| WO | 2012164760 A1 | | 12/2012 |

OTHER PUBLICATIONS

Machine translation of KR 2006-0099314 (no date).*
Search Report from International Application No. PCT/KR2016/013267, dated Apr. 6, 2016.
Fey, George Ting-Kuo, et al., "Thermal and electrochemical behavior of yttria-stabilized zirconia coated LiCoO2 during overcharge tests." Journal of Power Sources, vol. 189, 2009, pp. 837-840.
Cui, Yan, et al., "Improved electrochemical performance of La0.7Sr0.3MnO3 and carbon co-coated LiFePO4 synthesized by freeze-drying process." Electrochimica Acta, vol. 55, 2010, pp. 922-926.
Supplementary European Search Report for Application No. EP15865992, dated Oct. 20, 2017.
Kim, et al., Fabrication and characterization of a YSZ/YDC composite electrolyte by a sol-gel coating method, Journal of Power Sources, Jul. 2002, pp. 222-228, vol. 110, No. 1, Elsevier SA, CH.
Kim, et al., Sol-Gel Processing of Yttria-Stabilized Zirconia Films Derived from the Zirconium N-Butoxide-Acetic Acid-Nitric Acid-Waster-Isopropanol System, Journal of Materials Science, Apr. 2004, pp. 2683-2688, vol. 39, No. 8.
Search Report for Chinese Application 201580066090.7 dated Jun. 3, 2019.

* cited by examiner

POSITIVE ELECTRODE ACTIVE MATERIAL, METHOD FOR PREPARING THE SAME AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2015/013267, filed on Dec. 4, 2015, which claims the benefit of Korean Patent Application No. 10-2014-0174080 filed with the Korean Intellectual Property Office on Dec. 5, 2014, and Korean Patent Application No. 10-2015-0172360, filed with the Korean Intellectual Property Office on Dec. 4, 2015, the entire contents of which are hereby incorporated by reference.

TECHNICAL FIELD

The present invention relates to a positive electrode active material, a method for preparing the same, and a lithium secondary battery including the same.

BACKGROUND

Since their appearances in 1991 as a small, lightweight and high-capacity battery, lithium secondary batteries have been widely used as a power source of portable devices. With recent rapid developments in electronics, communications and computer industries, camcorders, mobile phones, laptops, PCs and the like have appeared and gone through remarkable developments, and demands for secondary batteries as an energy source driving these portable electronics and information communication devices have continuously increased.

However, lithium secondary batteries have a problem in that battery lifespan rapidly decreases as charge and discharge are repeated. Such a problem is particularly more serious at high temperatures and high voltages. This is due to a phenomenon occurring when an electrolyte is decomposed or an active material is degraded due to moisture inside the battery or other influences, or inner resistance of the battery increases.

In view of the above, a positive electrode active material for a lithium secondary battery that has been actively research and developed, and is currently used is a layer-structured $LiCoO_2$. $LiCoO_2$ is most widely used due to its excellent lifespan property and charge and discharge efficiency, but has low structural stability, and therefore, has a limit in the use in technologies enabling batteries to have high capacity.

Various lithium transition metal oxides such as $LiNiO_2$, $LiMnO_2$, $LiMn_2O_4$, $LiFePO_4$ or $Li(Ni_xCoyMnz)O_2$ have been developed as an alternative positive electrode active material. Among these, $LiNiO_2$ has an advantage of exhibiting a battery property of high discharge capacity, but has a problem of being difficult to be synthesized using a simple solid state reaction, and having poor thermal stability and cycle property. In addition, lithium manganese-based oxides such as $LiMnO_2$ or $LiMn_2O_4$ have an advantage of excellent thermal stability and low costs, but have a problem of small capacity and a poor high temperature property. Particularly, some $LiMn_2O_4$ has been commercialized as low-priced products, but does not have a favorable lifespan property due to structural distortion (Jahn-Teller distortion) caused by $Mn^{3+}$. Furthermore, extensive studies have been made on $LiFePO_4$ for application in hybrid electric vehicles (HEV) due to its low costs and excellent stability, however, $LiFePO_4$ is difficult to be used in other fields due to its low conductivity.

Under such circumstances, a material mostly favored as an alternative positive electrode active material for $LiCoO_2$ is $Li(Ni_xCo_yMn_z)O_2$ (herein, x, y and z are each independently an atomic fraction of oxide-forming elements, and $0<x\leq1$, $0<y\leq1$, $0<z\leq1$ and $0<x+y+z=1$). This material is less expensive than $LiCoO_2$, and has an advantage of capable of being used under high capacity and high voltage, but has a disadvantage of inferior rate capability and lifespan property at high temperatures.

Accordingly, various attempts to improve thermal stability, a capacity property, a cycle property or the like of a positive electrode active material through methods such as doping materials such as Al, Ti, Sn, Ag or Zn into the positive electrode active material, or dry or wet coating metals having favorable conductivity on a surface of the positive electrode active material have been made, however, the extent of improvement is still insufficient.

DISCLOSURE OF THE INVENTION

Technical Problem

A first object of the present invention is to provide a method for preparing a positive electrode active material capable of minimizing capacity decline in a battery occurring due to the formation of a non-uniform coating layer, and improving a lifespan property of a battery by forming a coating layer of a ceramic-based ion conductor having excellent lithium ion conductivity for lithium complex metal oxide particles to a uniform thickness.

A second object of the present invention is to provide a positive electrode active material prepared using the above-mentioned preparation method and thereby including a coating layer of a ceramic-based ion conductor capable of having an impact absorbing effect during a press process in positive electrode preparation while facilitating lithium ion migration on a lithium complex metal oxide particle surface, and as a result, capable of enhancing a capacity property and a lifespan property when used in a battery.

A third object of the present invention is to provide a positive electrode including the positive electrode active material.

A fourth object of the present invention is to provide a lithium secondary battery, a battery module and a battery pack including the positive electrode.

Technical Solution

In view of the above, one aspect of the present invention provides a method for preparing a positive electrode active material including mixing lithium complex metal oxide particles with a nanosol of a ceramic-based ion conductor and heat treating the resultant to form a coating layer including the ceramic-based ion conductor on the lithium complex metal oxide particles.

Another aspect of the present invention provides a positive electrode active material prepared using the above-mentioned preparation method, and including lithium complex metal oxide particles; and a coating layer located on the lithium complex metal oxide particles and including a ceramic-based ion conductor.

Still another aspect of the present invention provides a positive electrode including the positive electrode active material.

Still another aspect of the present invention provides a lithium secondary battery, a battery module and a battery pack including the positive electrode.

Effects of the Invention

By using a nanosol of a ceramic-based ion conductor having excellent lithium ion conductivity, a method for preparing a positive electrode active material according to the present invention is capable of uniformly coating a ceramic-based ion conductor that can have an impact absorbing effect during a press process in positive electrode preparation while facilitating lithium ion migration on a lithium complex metal oxide particle surface. As a result, a positive electrode active material prepared using the above-mentioned method is capable of exhibiting an enhanced lifespan property together with minimized capacity decline when used in a battery.

BRIEF DESCRIPTION OF THE DRAWINGS

The drawings accompanied in the present specification illustrate preferred embodiments of the present invention, and perform a role of further illuminating technological ideas of the present invention together with the contents of the invention described above, and accordingly, the present invention is not to be interpreted limiting to those described in the drawings.

BEST MODE FOR CARRYING OUT THE INVENTION

Hereinafter, the present invention will be described in more detail in order to illuminate the present invention. Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

A method for preparing a positive electrode active material according to one embodiment of the present invention includes mixing lithium complex metal oxide particles with a nanosol of a ceramic-based ion conductor and heat treating the resultant to form a coating layer including the ceramic-based ion conductor on the lithium complex metal oxide particles.

In the nanosol of the ceramic-based ion conductor, the ceramic-based ion conductor may specifically include at least one of ion conductive ceramic and metal ceramic.

The ion conductive ceramic may specifically include zirconia ($ZrO_2$)-based oxides doped with Y, Ca or Sc such as yttria-stabilized zirconia (YSZ), calcia-stabilized zirconia (CSZ) or scandia-stabilized zirconia (SSZ); ceria ($CeO_2$)-based oxides doped with Gd, Y or Sm such as gadolinia-doped ceria (GDC), samarium-doped ceria (SDC) or yttria-doped ceria (YDC); lanthanum-based oxides such as lanthanum strontium gallate magnesite (LSGM), lanthanum strontium manganite (LSM) or lanthanum strontium cobalt ferrite (LSCF), and these may be used either alone as one type or as a mixture of two or more types.

In addition, in the ion conductive ceramic, the YSZ is a ceramic material made to be stable even at room temperature by adding a yttrium oxide (yttria) to a zirconium oxide (zirconia). In the YSZ, some of $Zr^{4+}$ ions may be replaced with $Y^{3+}$ by adding yttria to zirconia. Accordingly, the compound is replaced by three $O^{2-}$ ions instead of four $O^{2-}$ ions and as a result, oxygen vacancy may be made. Due to the oxygen vacancy produced as above, YSZ has $O^{2-}$ ion conductivity, and conductivity becomes favorable as a temperature increases. Specifically, the YSZ is $Zr_{(1-x)}Y_xO_{2-x/2}$, and herein, $0.01 \leq x \leq 0.1$ and more specifically $0.08 \leq x \leq 0.1$. Meanwhile, in the present invention, room temperature means a temperature range of 23±5° C. unless particularly defined otherwise.

The CSZ is a ceramic material made to be stable even at room temperature by adding a calcium oxide (calcia) to a zirconium oxide (zirconia), and is capable of enhancing thermal stability of zirconia by adding calcia thereto. The CSZ is a mixed state of a cubic crystal structure and a tetragonal crystal structure. A tetragonal crystal structure changes to a cubic crystal structure when a temperature increases, and changes back to a tetragonal structure when a temperature decreases, and during such a crystal structure changing process, volume expansion and shrinkage may be repeated.

The SSZ is a ceramic material made to be stable even at room temperature by adding a scandium oxide (scandia) to a zirconium oxide (zirconia), and specific examples thereof may include $(ZrO_2)_{1-2x}(SC_2O_3)_x$, $(ZrO_2)_{1-2x}(SC_2O)_{3x-z}(Y_2O_3)_z$, $(ZrO_2)_{1-2x-z}(SC_2O_3)_x(CeO_2)_z$ (herein, $0.01 \leq x \leq 0.2$ and $0.01 \leq z \leq 0.1$) or the like.

The GDC is a gadolinium oxide ($Gd_2O_3$)-doped ceria, and has high ion conductivity like LSGM. Specific examples thereof may include $Gd_{0.1}Ce_{0.9}O_{1.95}$ or the like.

The LSGM is a lanthanum-strontium-gallium-magnesium oxide having high lithium ion conductivity by doping Sr and Mg, and specific examples thereof may include $(La_xSr_{1-x})(Ga_yMg_{1-y})O_{3-\delta}$ ($0.05 \leq x < 1$ and $0.05 \leq y < 1$, δ may be defined as a value meaning a small deviation from perfect stoichiometry) or the like.

The LSM is lanthanum manganite doping Sr to $LaMnO_3$, and has a manganese-based perovskite structure. Specific examples thereof may include LaSrMnO, $La_{(1-x)}Sr_xMnO_3$ ($0.01 \leq x \leq 0.3$), $La_{(1-y)}Sr_yMn_zO_{3-\delta}$ ($0.05 \leq y \leq 1$, $0.95 \leq z \leq 1.15$, δ may be defined as a value meaning a small deviation from perfect stoichiometry) or the like.

The LSCF is lanthanum ferrite doping Sr and Co to $LaFeO_3$, and is stable at high temperatures, and has high ion conductivity.

Meanwhile, the metal ceramic is prepared by mixing and sintering ceramic and metal powder, and has both ceramic properties of high heat resistance and high hardness, and metal properties having plastic deformation and electric conductivity. Specifically, in the metal ceramic, the ceramic may be the ion conductive ceramic described above, and the metal may be nickel, molybdenum, cobalt or the like. More specifically, the metal ceramic may be cermet such as nickel-yttria-stabilized zirconia cermet (Ni—YSZ cermet).

In the method for preparing a positive electrode active material according to one embodiment of the present invention, the ceramic-based ion conductor may have a single phase peak in an X-ray diffraction analysis using Cu (Kα-line).

In the method for preparing a positive electrode active material according to one embodiment of the present invention, the ceramic-based ion conductor may specifically include any one selected from the group consisting of YSZ, GDC, LSGM, LSM, CSZ, SSZ and Ni—YSZ, or a mixture of two or more types of these, and more specifically any one selected from the group consisting of YSZ, GDC, LSGM, SSZ and CSZ, or a mixture of two or more types of these.

In the method for preparing a positive electrode active material according to one embodiment of the present invention, the ceramic-based ion conductor may include YSZ, and the YSZ may be $Zr_{(1-x)}Y_xO_{2-x/2}$ (herein, $0.01 \leq x \leq 0.30$ and more specifically $0.08 \leq x \leq 0.10$). When forming a coating layer of YSZ on a lithium complex metal oxide particle surface, Y enters into a Zr site having a superstructure, and as a result, many empty spaces are produced on the surface of a positive electrode active material due to oxygen vacancy occurring inside the structure. Such empty spaces facilitate lithium intercalation and deintercalation on the surface of a positive electrode active material, and as a result, lithium ion conductivity on the active material particle surface greatly increases and accordingly, capacity and an output decrease of a battery may be minimized.

In the method for preparing a positive electrode active material according to one embodiment of the present invention, the ceramic-based ion conductor may include SSZ, and may include SSZ selected from the group consisting of $(ZrO_2)_{1-2x}(Sc_2O_3)_x$, $(ZrO_2)_{1-2x}(Sc_2O)_{3x-z}(Y_2O_3)_z$, $(ZrO_2)_{1-2x-z}(Sc_2O_3)_x(CeO_2)_z$ (herein, $0.01 \leq x \leq 0.2$ and $0.01 \leq z \leq 0.1$) and a mixture thereof.

In the method for preparing a positive electrode active material according to one embodiment of the present invention, the ceramic-based ion conductor may include CSZ having CaO content in 1 mol % to 20 mol % and more specifically in 2 mol % to 17 mol % in the total CSZ weight.

In the method for preparing a positive electrode active material according to one embodiment of the present invention, the ceramic-based ion conductor may have an average particle diameter ($D_{50}$) of 1 nm to 100 nm. When having a particle size in the above-mentioned range, uniform dispersion may be obtained in a sol. More specifically, the ceramic-based ion conductor may have an average particle diameter ($D_{50}$) of 1 nm to 50 nm and more specifically 1 nm to 5 nm.

In the present invention, the average particle diameter ($D_{50}$) of the ceramic-based ion conductor may be defined as a particle diameter at a 50% base in the particle diameter distribution. The average particle diameter ($D_{50}$) of the particles according to one embodiment of the present invention may be measured using a laser diffraction method. Generally, the laser diffraction method is capable of measuring a particle diameter from a submicron region to a few mm approximately, and results of high reproducibility and high resolution are capable of being obtained. For example, as the method of measuring an average particle diameter ($D_{50}$) of the YSZ, a nanosol of the YSZ is introduced to a commercially available laser diffraction particle size analyzer (for example, Microtrac MT 3000) and irradiated with ultrasonic waves of approximately 28 kHz with an output of 60 W, and the average particle diameter ($D_{50}$) at a 50% base in the particle diameter distribution in the measuring device may be calculated.

In addition, in the method for preparing a positive electrode active material according to one embodiment of the present invention, the nanosol of the ceramic-based ion conductor may be used in an amount to have the content of the ceramic-based ion conductor included in a finally prepared positive electrode active material from 50 ppm to 300,000 ppm and more specifically from 100 ppm to 10,000 ppm to the total weight of the positive electrode active material.

In the method for preparing a positive electrode active material according to one embodiment of the present invention, the nanosol of the ceramic-based ion conductor may be prepared by dissolving a precursor of a metal for forming a ceramic-based ion conductor in a glycol-based solvent, and then hydrating the resultant by adding water thereto.

A dispersion liquid prepared by dispersing ceramic-based ion conductor powder in a nanoparticle state in a solvent according to common methods does not exhibit lithium ion conductivity since the ceramic-based ion conductor is crystalline, and has very low reactivity for lithium as well. Accordingly, a uniform coating layer is difficult to be formed when coating is carried out on an active material surface. On the contrary, when preparing a nanosol of a ceramic-based ion conductor through a reaction of a precursor of a metal for forming a ceramic-based ion conductor as described above, a ceramic-based ion conductor in a hydroxide form having nano-level particle sizes, noncrystalline, and having a hydroxyl group on the surface is formed. Such a ceramic-based ion conductor not only exhibits lithium ion conductivity itself, but has excellent reactivity with lithium, and consequently, a uniform and highly efficient coating layer for a lithium complex metal oxide is capable of being formed in a finally prepared active material.

The glycol-based solvent capable of being used in the nanosol preparation is a dihydric alcohol having 2 hydroxyl groups in the molecule, and specific examples thereof may include ethylene glycol, propylene glycol, diethylene glycol, triethylene glycol, polyethylene glycol or the like, and any one or a mixture of two or more of these may be used.

In addition, as the precursor of the metal for forming a ceramic-based ion conductor may include a compound containing a metal for forming a ceramic-based ion conductor, and specifically, may include hydroxides, oxyhydroxides, alkoxides, carbonates, acetates, oxalates, citrates, nitrates, nitrides, sulfates, sulfides, halogenides, or hydrates thereof, and any one or a mixture of two or more of these may be used. The metal for forming a ceramic-based ion conductor may be a metal forming the ceramic-based ion conductor, and specific examples thereof may include one or more types of elements selected from the group consisting of rare-earth elements such as Y, Sc, Gd, Sm, Ce or La; and Zr, or a mixed element of these elements and one or more types of elements selected from the group consisting of alkali earth metal elements such as Ca, Mg or Sr; transition metals such as Mg, Co or Fe; and post transition metals such as Ga. As one example, a precursor of YSZ may use zirconium dinitrate dihydrate ($ZrO(NO_3)_2 \cdot 2H_2O$) as a Zr-including raw material and yttrium nitrate hexahydrate ($Y(NO_3)_3 \cdot 6H_2O$) as a Y-including raw material.

In addition, additives such as a chelating agent, a pH controlling agent or a dispersion agent may be further added when preparing the nanosol in order to increase solubility of the precursor of the metal for forming a ceramic-based ion conductor, and increasing dispersibility of the prepared ceramic-based ion conductor.

Specific examples of the pH controlling agent may include organic acids such as acetic acid, citric acid, lactic acid and formic acid, or basic compounds such as ammonia, and the pH controlling agent may be included in an amount to make the nanosol to have a pH of 6.5 to 8.

The dispersion agent may be specifically a polymer dispersion agent or a surfactant, and may be included in 1 part by weight or less, or in 0.1 parts by weight to 0.5 parts by weight to 100 parts by weight of the ceramic-based ion conductor.

In addition, in the nanosol preparation, a stirring or heat treating process may be selectively further carried out in order to increase solubility when the precursor of the metal for forming a ceramic-based ion conductor is dissolved in a glycol-based solvent. The stirring may be carried out using common mixing processes.

The heat treating process may be carried out at a temperature greater than or equal to 120° C. and less than or equal to a boiling point of a glycol-based solvent, and specifically, may be carried out at 120° C. to 300° C., more specifically at 120° C. to 200° C. and more specifically at 120° C. to 180° C.

In addition, after the heat treating process, a cooling process may be further carried out as necessary, and herein, the cooling process may be carried out using common methods such as natural cooling or cold air cooling.

During such a process dissolving the precursor of the metal for forming a ceramic-based ion conductor, a nanoparticle-level noncrystalline ceramic-based ion conductor is produced from a reaction between the precursors.

After that, a hydration reaction using water may be carried out for the resultantly obtained reaction material including the ceramic-based ion conductor. Herein, water; or a mixed solvent of water and a hydroxyl group-including solvent may be used, and specific examples of the hydroxyl group-including solvent may include alcohol (for example, methanol, ethanol, 1-propanol, 2-propanol and the like), polyol (for example, ethylene glycol, propylene glycol, diethylene glycol, dipropylene glycol, polyethylene glycol, butanediol, glycerin and the like) or the like, and any one or a mixture of two or more of these may be used.

The hydration reaction may have excellent reactivity for lithium by water molecules binding to the ceramic-based ion conductor, and a uniform and highly efficient coating layer for a lithium complex metal oxide is capable of being formed in a finally prepared active material.

In addition, in the method for preparing a positive electrode active material according to one embodiment of the present invention, any one selected from the group consisting of aluminum (Al), niobium (Nb), titanium (Ti), tungsten (W), molybdenum (Mo), chromium (Cr), copper (Cu), vanadium (V) and zinc (Zn), or a mixed metal of two or more types of these; or a nanosol of the above-mentioned metals may be further included in the nanosol of the ceramic-based ion conductor.

The above-mentioned metals are capable of further improving battery properties by being included in an oxide form in the coating layer of a finally prepared positive electrode active material. Such metals may be included in an amount to have the metal oxide concentration included in a finally prepared positive electrode active material from 50 ppm to 300,000 ppm and more specifically from 100 ppm to 10,000 ppm.

Like the preparation of the nanosol of the ceramic-based ion conductor described above, the nanosol of the metal may be prepared by preparing a metal nanosol by dissolving and reacting a precursor of a metal in a glycol-based solvent, and then hydrating the resultant by adding water thereto.

The precursor of the metal may include a compound including any one selected from the group consisting of aluminum (Al), niobium (Nb), titanium (Ti), tungsten (W), molybdenum (Mo), chromium (Cr), copper (Cu), vanadium (V) and zinc (Zn), or a mixed metal of two or more types of these. Specifically, hydroxides, oxyhydroxides, alkoxides, carbonates, acetates, oxalates, citrates, nitrates, nitrides, sulfates, sulfides, halogenides, or hydrates thereof, may be included, and any one or a mixture of two or more of these may be used.

Meanwhile, in the method for preparing a positive electrode active material according to one embodiment of the present invention, the lithium complex metal oxide may be a complex metal oxide of lithium and one or more types of metals selected from the group consisting of nickel, manganese and cobalt. Specifically, the lithium complex metal oxide may include a compound of the following Chemical Formula 1:

$$Li_{1+a}Ni_{1-b-c}Mn_bCo_cO_2 \quad \text{<Chemical Formula 1>}$$

In Chemical Formula 1, $0 \le a \le 0.33$, $0 \le b \le 0.5$ and $0 \le c \le 0.5$, more specifically $0 \le a \le 0.09$ and even more specifically $a=0$. When a is greater than 0.33 in Chemical Formula 1, a difference in a lifespan property effect of coating a ceramic-based ion conductor to lithium complex metal oxide particles may not be significant with approximately 10% or less compared to coating a metal oxide using common doping methods. When a is 0.09 or less, and particularly 0 in Chemical Formula 1, a difference in the lifespan property effect of coating a ceramic-based ion conductor to lithium complex metal oxide particles may be significant with up to 30% to 70% compared to coating a metal oxide using common doping methods.

In the method for preparing a positive electrode active material according to one embodiment of the present invention, the lithium complex metal oxide may include any one selected from the group consisting of $LiCoO_2$, $LiMnO_2$, $LiMn_2O_4$, $LiNiO_2$ and a lithium nickel manganese cobalt oxide (for example, $Li(Ni_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$ or the like), or a mixture of two or more of these in terms of enhancing a capacity property and stability of a battery, and more specifically, may include a lithium nickel manganese cobalt oxide.

The positive electrode active material according to one embodiment of the present invention may have an average particle diameter ($D_{50}$) of 3 μm to 25 μm and more specifically 5 μm to 25 μm. In the present invention, the average particle diameter ($D_{50}$) of the lithium complex metal oxide particles is measured in the same manner as described in the average particle diameter ($D_{50}$) of the ceramic-based ion conductor.

The positive electrode active material according to one embodiment of the present invention may be primary particles of a lithium complex metal oxide, or secondary particles formed from an assembly of the primary particles. When the positive electrode active material is primary particles of a lithium complex metal oxide, generation of surface impurities such as $Li_2CO_3$ and LiOH caused by reactions with moisture or $CO_2$ in air is reduced, which leads to little concern for battery capacity decline and gas generation, and excellent high temperature stability may also be obtained. In addition, when the positive electrode active material is secondary particles formed from an assembly of primary particles, an output property may be more superior. In the case of secondary particles, the primary particles may have an average particle diameter ($D_{50}$) of 10 nm to 200 nm. Such an active material particle form may be properly determined depending on the composition of a lithium complex metal oxide forming an active material.

In the method for preparing a positive electrode active material according to one embodiment of the present invention, the mixing of the lithium complex metal oxide particles and the ceramic-based ion conductor nanosol may be carried out through, for example, forming a colloidal ceramic-based ion conductor nanosol by adding a solvent and a dispersion agent to the ceramic-based ion conductor or a precursor thereof and stirring the resultant, and then surface treating the nanosol with the lithium complex metal oxide particles using various methods such as mixing, coating, spraying or immersion.

In addition, in the method for preparing a positive electrode active material according to one embodiment of the present invention, the heat treatment may be carried out for 4 hours to 10 hours in a temperature range of 100° C. to 600° C. Under such a temperature condition, a coating layer including a ceramic-based ion conductor and selectively a metal oxide may be formed on a surface of the lithium complex metal oxide particles through heat treatment.

The method for preparing a positive electrode active material according to one embodiment of the present invention may further include a baking process after the heat treatment.

The baking process may be carried out for 4 hours to 10 hours in a temperature range of 500° C. to 1000° C. When the baking process is further carried out under such a temperature condition, metal oxidation is facilitated, and the ceramic-based ion conductor and a metal element of the metal oxide selectively used when forming the coating layer may be included inside the lithium complex metal oxide particles having a concentration gradient with the concentration decreasing from a surface of the lithium complex metal oxide particles to the inside.

In this case, the metal element may be present from a surface of the lithium complex metal oxide particles to the inside of approximately 500 nm. When forming a complex with the lithium complex metal oxide particles as above, structural stability and an electrochemical property may be improved by preventing a structural crystal decay of a positive electrode active material.

The metal element-doped lithium complex metal oxide may specifically include a compound of the following Chemical Formula 2:

<Chemical Formula 2>

In Chemical Formula 2, M' is a metal element derived from a ceramic-based ion conductor, and specific examples thereof may include any one or a mixed element of two or more selected from the group consisting of Y, Zr, La, Sr, Ga, Mg, Sc, Gd, Sm, Ca, Ce, Co, Mn and Fe, more specifically any one or a mixed element of two or more selected from the group consisting of Y, Zr, La, Sr, Ga, Sc, Gd, Sm and Ce, and even more specifically at least any one element selected from the group consisting of Y and Zr.

In addition, in Chemical Formula 2, M" is derived from a metal nanosol that may be selectively included in the nanosol, and specific examples thereof may include any one or a mixed element of two or more selected from the group consisting of Al, Nb, Ti, W, Mo, Cr, Cu, V and Zn, and more specifically any one or a mixed element of two or more selected from the group consisting of Al, Nb and Ti.

Furthermore, in Chemical Formula 2, $0<A<1$, $0\leq a\leq0.33$, $0\leq b\leq0.5$, $0\leq c\leq0.5$, $0<s\leq0.2$ and $0\leq v\leq0.2$, more specifically $0\leq a\leq0.09$ and even more specifically $0.9<A<1$ and $a=0$.

In addition, in Chemical Formula 2, M' and M" may be each independently distributed in a concentration gradient gradually decreasing from a particle surface to a center in lithium complex metal oxide particles. By the concentration of the doped metal being distributed in a concentration gradient gradually changing depending on the location in positive electrode active material particles, a sharp phase boundary area does not exist in the active material, and as a result, crystal structures become stabilized and thermal stability increases. Furthermore, when a concentration gradient in which the doped elements are distributed in high concentrations on a surface side of active material particles and the concentrations gradient decrease closer to a particle center is included, capacity decline may be prevented while exhibiting thermal stability.

Specifically, in the positive electrode active material according to one embodiment of the present invention, when the concentrations of the doped elements M' and M" show a concentration gradient, a concentration difference in M' may be from 10 atom % to 90 atom %, and a concentration difference in M" may be from 10 atom % to 90 atom % in a region of 10 volume % or less from a particle center (hereinafter, simply referred to as '$Rc_{10}$ region') and in a region of 10 volume % or less from a particle surface (hereinafter, simply referred to as '$Rs_{10}$ region'), based on the total atomic weight of each doped element M' and M" included in the positive electrode active material.

In the present invention, the concentration gradient structure and the concentration of the doped element in the positive electrode active material particles may be identified using methods such as an Electron Probe Micro Analyzer (EPMA), an Inductively Coupled Plasma-Atomic Emission Spectrometer (ICP-AES) or a Time of Flight Secondary Ion Mass Spectrometry (ToF-SIMS), and specifically, an atomic ratio of each metal may be measured using an EPMA while moving the EPMA from a center to a surface of the positive electrode active material.

By forming a coating layer including a ceramic-based ion conductor on a surface of lithium complex metal oxide particles using a nanosol of a ceramic-based ion conductor, the method for preparing a positive electrode active material according to one embodiment of the present invention is capable of more uniformly forming a coating layer on a lithium complex metal oxide particle surface compared to existing wet mixing methods, and also by reducing the amount of a solvent used, damages occurring to the lithium complex metal oxide particles caused by the solvent may be minimized.

In addition, a positive electrode active material prepared using the above-mentioned preparation method includes specific complex particles having a single phase, that is, a noncrystalline ceramic-based ion conductor, and therefore, is capable of minimizing capacity decline and an output decrease of a secondary battery. Besides, due to a structural property of the ceramic-based ion conductor, cracking of a positive electrode active material may be minimized by having an impact absorbing effect during a positive electrode process, particularly a press process, and as a result, a lifespan property may be further enhanced when used in a secondary battery.

Accordingly, another embodiment of the present invention provides a positive electrode active material prepared using the above-mentioned preparation method.

Specifically, the positive electrode active material may include lithium complex metal oxide particles, and a coating layer located on the lithium complex metal oxide particles and including a ceramic-based ion conductor. Herein, the lithium complex metal oxide particles and the ceramic-based ion conductor are the same as those described above.

In the positive electrode active material according to one embodiment of the present invention, the coating layer may include a single phase ceramic-based ion conductor. The single phase ceramic-based ion conductor shows a single phase peak in an XRD measurement.

In the positive electrode active material according to one embodiment of the present invention, the coating layer may include any one, two or more selected from the group consisting of YSZ, CSZ, SSZ, GDC, LSGM, LSM and Ni—YSZ as the ceramic-based ion conductor.

In the positive electrode active material according to one embodiment of the present invention, the coating layer may include any one selected from the group consisting of YSZ, CSZ, SSZ, GDC and LSGM, or a mixture of two or more types of these as a zirconia-based ceramic ion conductor.

In addition, the YSZ may be $Zr_{(1-x)}Y_xO_{2-x/2}$, $0.01 \leq x \leq 0.08$ and more specifically $0.03 \leq x \leq 0.08$. When the YSZ is included, Y may enter into a Zr site to first form a single phase, and by the positive electrode active material having a superstructure, oxygen vacancy is generated inside the structure causing many empty spaces. In the lithium ion migration channel in the YSZ, many spaces through which Li is capable of getting out are produced on the positive electrode active material surface due to empty spaces caused by oxygen vacancy inside the YSZ structure. In addition, when finding paths through which lithium ions are capable of passing in the YSZ and analyzing ion conductivity of the lithium ions, there is an energy difference of approximately 1.0 eV in a region having oxygen deficiency. Through this, lithium ion conductivity may greatly increase when connecting paths having oxygen deficiency, and capacity decline or an output decrease may be minimized due to such oxygen deficiency when using a positive electrode active material including YSZ is used in a secondary battery. In addition, due to the structural formation of empty spaces, cracking of a positive electrode active material may be minimized by having an impact absorbing effect during a positive electrode process, particularly a press process.

The SSZ may be specifically $(ZrO_2)_{1-2x}(Sc_2O_3)_x$, $(ZrO_2)_{1-2x}(SC_2O)_{3x-z}(Y_2O_3)_z$, or $(ZrO_2)_{1-2x-z}(SC_2O_3)_x(CeO_2)_z$ (herein, $0.01 \leq x \leq 0.2$ and $0.01 \leq z \leq 0.1$).

The CSZ may have CaO content in 2% by weight to 17% by weight in the total CSZ weight.

In the positive electrode active material according to one embodiment of the present invention, the ceramic-based ion conductor may be included in the coating layer in an amount to have the content of 50 ppm to 300,000 ppm and more specifically 100 ppm to 10,000 ppm to the total weight of the positive electrode active material.

In addition, in the positive electrode active material according to one embodiment of the present invention, the coating layer may further include an oxide including one or more elements of Al, Nb, Ti, Ca, W, Mo, Fe, Cr, Cu, V, and Zn, and the oxide including the element may be included in the coating layer in an amount to have the content of 50 ppm to 300,000 ppm and more specifically 100 ppm to 10,000 ppm to the total weight of the positive electrode active material.

In the positive electrode active material according to one embodiment of the present invention, the coating layer may be formed in a thickness range of 1 nm to 5000 nm from an external surface of the lithium complex metal oxide particles.

In the positive electrode active material according to one embodiment of the present invention, the coating layer has excellent thickness uniformity by using a nanosol in the preparation. Specifically, the coating layer may have thickness uniformity of 20 nm or less. Herein, the thickness uniformity means a thickness variation between a maximum thickness value and a minimum thickness value.

The positive electrode active material according to one embodiment of the present invention may have an average particle diameter ($D_{50}$) of 3 μm to 30 μm, and more specifically, the positive electrode active material may have an average particle diameter ($D_{50}$) of 5 μm to 10 μm considering rate property and initial capacity property improving effects of a battery from optimization of a specific surface area and positive electrode mixture density.

The positive electrode active material according to one embodiment of the present invention may be primary particles of a lithium complex metal oxide, or secondary particles formed from an assembly of the primary particles. When the positive electrode active material is primary particles of a lithium complex metal oxide, generation of surface impurities such as $Li_2CO_3$ and LiOH caused by reactions with moisture or $CO_2$ in air is reduced, which leads to little concern for battery capacity decline and gas generation, and excellent high temperature stability may also be obtained. In addition, when the positive electrode active material is secondary particles formed from an assembly of primary particles, an output property may be more superior. In the case of secondary particles, the first particles may have an average particle diameter of 10 nm to 200 nm. Such an active material particle form may be properly determined depending on the composition of a lithium complex metal oxide forming an active material.

Still another embodiment of the present invention provides a positive electrode including the positive electrode active material prepared using the above-mentioned preparation method.

The positive electrode may be prepared using common positive electrode preparation methods known in the art except that the above-mentioned positive electrode active material is used. For example, the positive electrode may be prepared by mixing a solvent, and as necessary, a binder, a conductor or a dispersion agent to the positive electrode active material, and stirring the resultant to prepare slurry, and then applying (coating) the resultant on a positive electrode collector and drying the resultant to form a positive electrode active material layer.

The positive electrode collector is a metal having high conductivity, and is not particularly limited in the use as long as it is a metal to which slurry of the positive electrode active material readily adheres and having no reactivity in a voltage range of a battery. Nonlimiting examples of the positive electrode collector include aluminum, nickel or foil prepared from combinations thereof.

Examples of a solvent for forming the positive electrode include organic solvents such as N-methyl pyrrolidone (NMP), dimethylformamide (DMF), acetone and dimethyl acetamide, water, or the like, and these solvents may be used either alone or as a mixture of two or more types. The amount of the solvent used is sufficient when it is capable of dissolving and dispersing the positive electrode active material, a binder and a conductor considering a slurry coating thickness and a preparation yield.

As the binder, various types of binder polymers such as a vinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, fluorine rubber, polyacrylic acid and polymers substituting hydrogens thereof with Li, Na, Ca or the like, or various copolymers may be used. The binder may be included in 1% by weight to 30% by weight to the total weight of the positive electrode active material layer.

The conductor is not particularly limited as long as it has conductivity without causing chemical changes in the corresponding battery, and examples thereof may include graphite such as natural graphite or artificial graphite; carbon-based materials such as carbon black, acetylene black, Ketjen black, channel black, furnace black, lamp black, thermal black, carbon nanotubes or carbon fiber; metal powder or metal fiber of copper, nickel, aluminum or silver; conductive whiskers such as fluorocarbon, zinc oxide or potassium titanate; conductive metal oxides such as titanium oxide; conductive polymers such as polyphenylene derivatives, or the like, and any one or a mixture of two or more of these may be used. The conductor may be included in 1% by weight to 30% by weight to the total weight of the positive electrode active material layer.

Still another embodiment of the present invention provides a lithium secondary battery including the positive electrode active material prepared using the above-mentioned preparation method.

The lithium secondary battery specifically includes the positive electrode, a negative electrode, and a separator provided between the positive electrode and the negative electrode.

As a negative electrode active material used in the negative electrode, carbon materials capable of absorbing and releasing lithium ions, lithium metal, silicon, tin or the like may be commonly used. Carbon materials are preferably used, and both low crystalline carbon and high crystalline carbon may be used as the carbon material. Low crystalline carbon typically includes soft carbon and hard carbon, and high crystalline carbon typically includes natural graphite, Kish graphite, pyrolytic carbon, mesophase pitch based carbon fiber, meso-carbon microbeads, mesophase pitches and high-temperature baked carbon such as petroleum or coal tar pitch derived cokes. In addition, the negative electrode collector is generally made to a thickness of 3 μm to 500 μm. Such a negative electrode collector is not particularly limited as long as it has conductivity without inducing chemical changes in the corresponding battery, and examples thereof may include copper, stainless steel, aluminum, nickel, titanium, baked carbon, copper or stainless steel of which surface is treated with carbon, nickel, titanium, silver or the like, an aluminum-cadmium alloy, or the like. Like the positive electrode collector, adhesion of the negative electrode active material may increase by forming a fine concavo-convex on the surface, and various forms such as films, sheets, foil, nets, porous materials, foams and non-woven fabrics may be used.

Like the positive electrode, those commonly used in the art may be used as the binder and the conductor used in the negative electrode. The negative electrode may be prepared from preparing negative electrode active material slurry by mixing and stirring the negative electrode active material and the additives, applying the slurry on the collector, and then compressing the resultant.

In addition, as the separator, common porous polymer films that have been used as a separator in the art, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

As a lithium salt that may be included as the electrolyte used in the present invention, those commonly used as an electrolyte for lithium secondary batteries may be used without limit, and examples of an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may include an organic-based liquid electrolyte, an inorganic-based liquid electrolyte, a solid polymer electrolyte, a gel-type polymer electrolyte, a solid inorganic electrolyte, a melting inorganic electrolyte and the like capable of being used in manufacturing lithium secondary batteries, but is not limited thereto.

The lithium secondary battery having such a constitution may be manufactured from preparing an electrode assembly by providing a separator between a positive electrode and a negative electrode, placing the electrode assembly inside a case, and then injecting an electrolyte into the case.

The lithium secondary battery including the positive electrode active material according to the present invention as above stably exhibits excellent discharge capacity, an output property and a capacity retention rate, therefore, is useful in the field of portable devices such as mobile phones, laptop computers and digital cameras, and the field of electric vehicles such as hybrid electric vehicles, and the like.

Still another embodiment of the present invention provides a battery module including the lithium secondary battery as a unit cell, and a battery pack including the same.

The battery module or the battery pack may be used as a power supply of a medium to large sized device of any one or more of power tools; electric vehicles including electric vehicles (EV), hybrid electric vehicles (HEV) and plug-in hybrid electric vehicle (PHEV); or systems for power storage.

Hereinafter, the present invention will be described in detail with reference to examples in order to specifically describe the present invention. However, the examples of the present invention may be modified to various other forms and the scope of the present invention shall not be interpreted to be limited to the examples described below. The examples of the present invention are provided in order to more completely describe the present invention for those having average knowledge in the art.

PREPARATION OF NANOSOL

Preparation Example 1

After dissolving 20 g of zirconium dinitrate dihydrate ($ZrO(NO_3)_2 \cdot 2H_2O$) and 2.7 g of yttrium nitrate hexahydrate ($Y(NO_3)_3 \cdot 6H_2O$) in 400 g of ethylene glycol ($C_2H_6O_2$), the resultant was stirred to prepare a mixed solution. The mixed solution was heated for 5 hours at a temperature of 160° C. while stirring, cooled to a temperature of 90° C., and water was introduced thereto to prepare a YSZ nanosol ($Zr_{(1-x)}Y_xO_{2-x/2}$, x value=0.094, weight ratio of Y:Zr in YSZ=9:91) having an average particle diameter ($D_{50}$) of 10 nm.

Preparation Example 2

A CSZ nanosol (CaO content in CSZ=5 mol %, weight ratio of Ca:Zr=2:98) was prepared in the same manner as in Preparation Example 1 except that calcium nitrate tetrahydrate ($Ca(NO_3)_2 \cdot 4H_2O$) was used in an amount of 0.85 g instead of the yttrium nitrate hexahydrate in Preparation Example 1.

Preparation Example 3

An SSZ nanosol (($ZrO_2)_{1-2x}(Sc_2O_3)_x$, x value=0.12, weight ratio of Sc:Zr in SSZ=6:94) was prepared in the same manner as in Preparation Example 1 except that scandium nitrate hydrate ($Sc(NO_3)_3 \cdot H_2O$) was used in an amount of 2.55 g instead of the yttrium nitrate hexahydrate in Preparation Example 1.

Preparation Example 4

A GDC nanosol ($Gd_{0.1}Ce_{0.9}O_{1.95}$, weight ratio of Gd:Ce in GDC=14:86) was prepared in the same manner as in Preparation Example 1 except that 40 g of cerium nitrate hexahydrate ($Ce(NO_3)_3 \cdot 6H_2O$) and 6 g of gadolinium nitrate hexahydrate ($Gd(NO_3)_3 \cdot 6H_2O$) were used instead of the zirconium dinitrate dihydrate and the yttrium nitrate hexahydrate in Preparation Example 1.

Preparation Example 5

An LSGM nanosol (($La_xSr_{1-x}$) ($Ga_yMg_{1-y}$) $O_3$, x=0.75, y=0.78, weight ratio of La:Sr:Ga:Mg in LSGM=58:12:28:2) was prepared in the same manner as in Preparation Example 1 except that 10 g of lanthanum nitrate hexahydrate ($La(NO_3)_3 \cdot 6H_2O$), 1.55 g of strontium nitrate ($Sr(NO_3)_2$), 6 g of gallium nitrate hydrate ($Ga(NO_3)_3 \cdot H_2O$) and 1.55 g of magnesium nitrate hexahydrate ($Mg(NO_3)_2 \cdot 6H_2O$) were mixed and used instead of the zirconium dinitrate dihydrate and the yttrium nitrate hexahydrate in Preparation Example 1.

Preparation Example 6

After dispersing 20 g of nickel chloride ($NiCl_2$) into 400 g of an ethylene glycol ($C_2H_6O_2$) solution, the resultant was stirred to prepare a mixed solution. The mixed solution was heated for 5 hours at a temperature of 160° C. while stirring, cooled to a temperature of 90° C., and water was introduced thereto to prepare a Ni nanosol having an average particle diameter ($D_{50}$) of 10 nm.

PREPARATION OF LITHIUM COMPLEX METAL OXIDE

Preparation Example 7

A precursor was prepared by placing 89.46 g of LiOH ($H_2O$) and 200 g of $Ni_{0.6}Mn_{0.2}Co_{0.2}(OH)_2$ having an average particle diameter of 5 μm, and mixing the resultant for 1 minute at a speed of test mixer center rpm of 18000 rpm.

The precursor prepared above was placed in an alumina crucible, and baked under air atmosphere for 6 hours at approximately 860° C. A cake obtained after the bake was grinded, and allocated using a 400 mesh sieve [Tyler standard screen scale of USA] to obtain $LiNi_{0.6}Mn_{0.2}Co_{0.2}O_2$ (average particle diameter ($D_{50}$): 5 μm).

PREPARATION OF POSITIVE ELECTRODE ACTIVE MATERIAL

EXAMPLE 1-1

The YSZ nanosol having an average particle diameter ($D_{50}$) of 10 nm prepared in Preparation Example 1 was placed and mixed with 50 g of the $LiNi_{0.6}Mn_{0.2}Co_{0.2}O_2$ (average particle diameter ($D_{50}$): 5 μm) preparation in Preparation Example 7 so that the included content became 0.2% by weight to the total weight of a finally prepared positive electrode active material. The resultant mixture was heat treated for 6 hours at 400° C., and mortared and sieved to prepare a positive electrode active material including the YSZ on the $LiNi_{0.6}Mn_{0.2}Co_{0.2}O_2$ particle surface.

Example 1-2

A positive electrode active material was prepared in the same manner as in Example 1-1 except that the CSZ nanosol prepared in Preparation Example 2 was used instead of the YSZ nanosol prepared in Preparation Example 1.

Example 1-3

A positive electrode active material was prepared in the same manner as in Example 1-1 except that the SSZ nanosol prepared in Preparation Example 3 was used instead of the YSZ nanosol prepared in Preparation Example 1.

Example 1-4

A positive electrode active material was prepared in the same manner as in Example 1-1 except that the GDC nanosol prepared in Preparation Example 4 was used instead of the YSZ nanosol prepared in Preparation Example 1.

Example 1-5

A positive electrode active material was prepared in the same manner as in Example 1-1 except that the LSGM nanosol prepared in Preparation Example 5 was used instead of the YSZ nanosol prepared in Preparation Example 1.

Example 1-6

A positive electrode active material (average particle diameter ($D_{50}$): 5 μm) in which a surface treatment layer including a YSZ ceramic-based ion conductor and NiO was formed on a surface side of $LiNi_{0.6}Mn_{0.2}Co_{0.2}O_2$ particles was prepared in the same manner as in Example 1-1 except that the Ni nanosol prepared in Preparation Example 6 was additionally mixed and used with the YSZ nanosol so that the Ni content became 0.2% by weight to the total weight of the lithium complex metal oxide.

Comparative Example 1-1

A positive electrode active material (average particle diameter ($D_{50}$): 5 μm) was prepared in the same manner as in Example 1-1 except that the YSZ nanosol was not introduced.

Comparative Example 1-2

A positive electrode active material was prepared in the same manner as in Example 1-1 except that an aqueous dispersion liquid containing YSZ powder having an average particle diameter ($D_{50}$) of 50 nm was used instead of the YSZ nanosol in Example 1-1.

MANUFACTURE OF LITHIUM SECONDARY BATTERY

Example 2-1

Preparation of Positive Electrode

94% by weight of the positive electrode active material prepared in Example 1-1, 3% by weight of carbon black as a conductor, and 3% by weight of polyvinylidene fluoride (PVdF) as a binder were added to N-methyl-2-pyrrolidone (NMP), a solvent, to prepare positive electrode slurry. The positive electrode slurry was applied on an aluminum (Al) thin film, a positive electrode collector, having a thickness of approximately 20 μm, and the resultant was dried and roll pressed to prepare a positive electrode.

Preparation of Negative Electrode 96.3% by weight of graphite powder as a negative electrode active material, 1.0% by weight of super-p as a conductor, and 1.5% by weight and 1.2% by weight of styrene butadiene rubber (SBR) and carboxymethylcellulose (CMC) as a binder were mixed and added to NMP, a solvent, to prepare negative electrode slurry. The negative electrode slurry was applied on a copper (Cu) thin film, a negative electrode collector, having a thickness of approximately 10 μm, and the resultant was dried and roll pressed to prepare a negative electrode.

Preparation of Non-aqueous Electrolyte

To a non-aqueous electrolyte solvent prepared by mixing ethylene carbonate and diethyl carbonate in a volume ratio of 30:70 as an electrolyte, $LiPF_6$ was added, and a 1 M $LiPF_6$ non-aqueous electrolyte was prepared.

Manufacture of Lithium Secondary Battery

A cell was manufactured by providing a porous polyethylene separator between the positive electrode and the negative electrode prepared above, and injecting a lithium salt-containing electrolyte thereto.

Example 2-2 to 2-6

A lithium secondary battery was manufactured in the same manner as in Example 2-1 except that the positive electrode active materials prepared in Examples 1-2 to 1-6 were each used.

Comparative Example 2-1 and 2-2

A lithium secondary battery was manufactured in the same manner as in Example 2-1 except that the positive electrode active materials prepared in Comparative Examples 1-1 and 1-2 were each used.

Test Example

Nanosol Analysis

The nanosol of the ceramic-based ion conductor prepared in Preparation Example 1 was observed using a transmission electron microscopy (TEM), and an X-ray diffraction analysis (XRD) was performed thereon.

Figure 1:
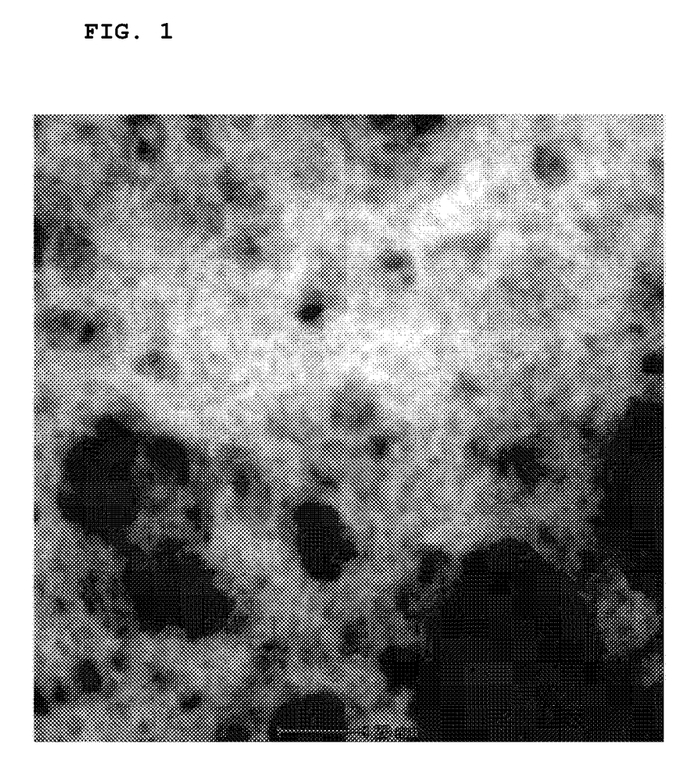
FIG. 1 is a picture observing a nanosol of a ceramic-based ion conductor prepared in Preparation Example 1 using a transmission electron microscopy.
Figure 2:
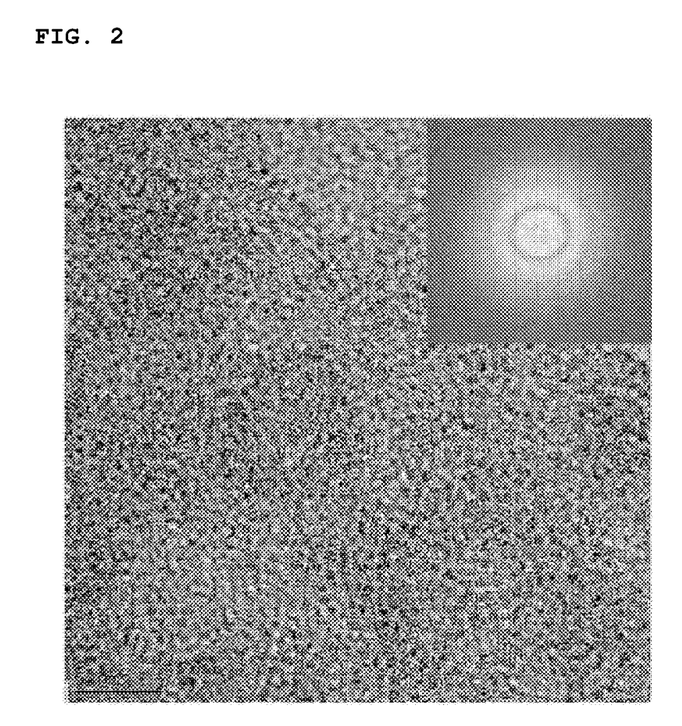
FIG. 2 shows an X-ray diffraction analysis resultant for a nanosol of a ceramic-based ion conductor prepared in Preparation Example 1.

The results are shown in FIG. 1 and FIG. 2.

As a result of the observation, it was identified that YSZ having an average particle diameter ($D_{50}$) of 5 nm or less in the nanosol, and noncrystalline with no crystalline pattern was prepared in a hydroxide form.

Test Example

Analysis On Positive Electrode Active Material

Figure 3:
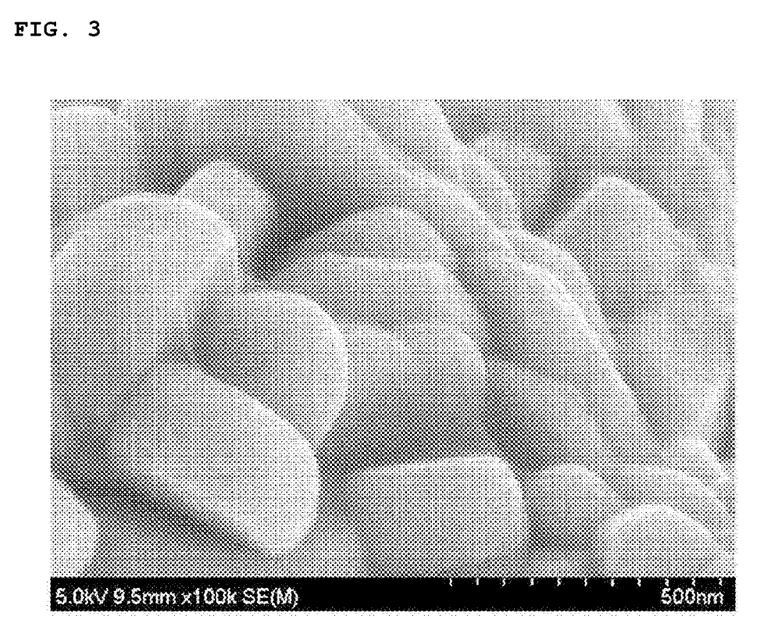
FIG. 3 is a picture observing a surface of a positive electrode active material prepared in Example 1-1 using a Field-Emission Scanning Electron Microscope (FE-SEM).

A surface of the positive electrode active material prepared in Example 1-1 was observed using a Field-Emission Scanning Electron Microscope (FE-SEM), and the resultant was shown in FIG. 3.

From FIG. 3, it was identified that YSZ nanoparticles were uniformly coated on the $LiNi_{0.6}Mn_{0.2}Co_{0.2}O_2$ oxide surface.

In addition, a surface of the positive electrode active material prepared in Example 1-6 was also observed in the same manner.

As a result, it was identified that a coating layer including NiO particles together with the YSZ nanoparticles was formed on the $LiNi_{0.6}Mn_{0.2}Co_{0.2}O_2$ oxide surface in the active material of Example 1-6.

Figure 4:
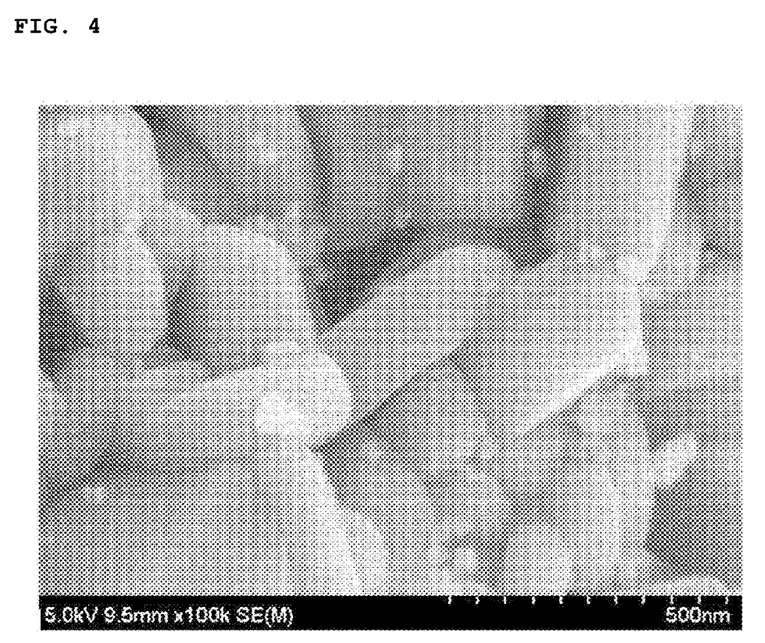
FIG. 4 is a picture observing a surface of a positive electrode active material prepared in Comparative Example 1-2 using a FE-SEM.

In addition, a surface of the positive electrode active material prepared in Comparative Example 1-2 was observed using a FE-SEM, and the resultant is shown in FIG. 4.

As shown in FIG. 4, it was identified that, when coating was carried out using a YSZ powder-containing aqueous dispersion liquid, YSZ powder was non-uniformly coated on the $LiNi_{0.6}Mn_{0.2}Co_{0.2}O_2$ oxide surface unlike the positive electrode active material prepared in Example 1-1.

Test Example

Analysis On Positive Electrode Active Material

XRD analysis was performed on the positive electrode active material prepared in Example 1-1, and a YSZ crystal structure included in the coating layer was identified. For comparison, an XRD analysis was also performed on $ZrO_2$.

XRD analysis was performed under the condition as follows using Cu (Kα-line).

Target: Cu (Kα-line) graphite monochromator

Slit: divergence slit=0.5 degrees, receiving slit=9.55 mm, scattering slit=5.89 degrees Measuring zone and step angle/measuring time: −10.0 degrees<2θ<90 degrees, 0.5 seconds, 0.024 degrees. Herein, 2θ represents a diffraction angle.

As a result of the measurements, YSZ showed a cubic crystal structure, and exhibited a single phase peak with main peak 2θ present between 29 degrees and 31 degrees. Meanwhile, $ZrO_2$ showed monoclinic crystal structure, which is entirely different from the YSZ, and exhibited a main peak between 27.5 degrees and 28.5 degrees and a secondary peak between 31.1 degrees and 31.8 degrees.

Test Example

Electrochemistry Test

<Evaluation on Battery Cycle Property>

In order to examine a capacity decline rate depending on the number of cycles for the lithium secondary batteries including the positive electrode active materials each prepared in Examples 1-1 to 1-6 and Comparative Examples 1-1 and 1-2 (Examples 2-1 to 2-6 and Comparative Examples 2-1 and 2-2), an electrochemistry evaluation test was carried out as follows.

Specifically, the lithium secondary batteries manufactured in Examples 2-1 to 2-6 and Comparative Examples 2-1 and 2-2 were charged up to 4.25 V with a constant current (CC) of 0.5 C at 25° C., and after that, charged with a constant voltage (CV) of 4.25 V until a charge current became 0.05 mAh to carry out first charge. After that, the battery was left unattended for 20 minutes, and discharged down to 3.0 V with a constant current of 1 C (cut-off was 0.05 C). This was repeated for a cycle of 1 to 50 times and the results are shown in FIG. 5.

Figure 5:
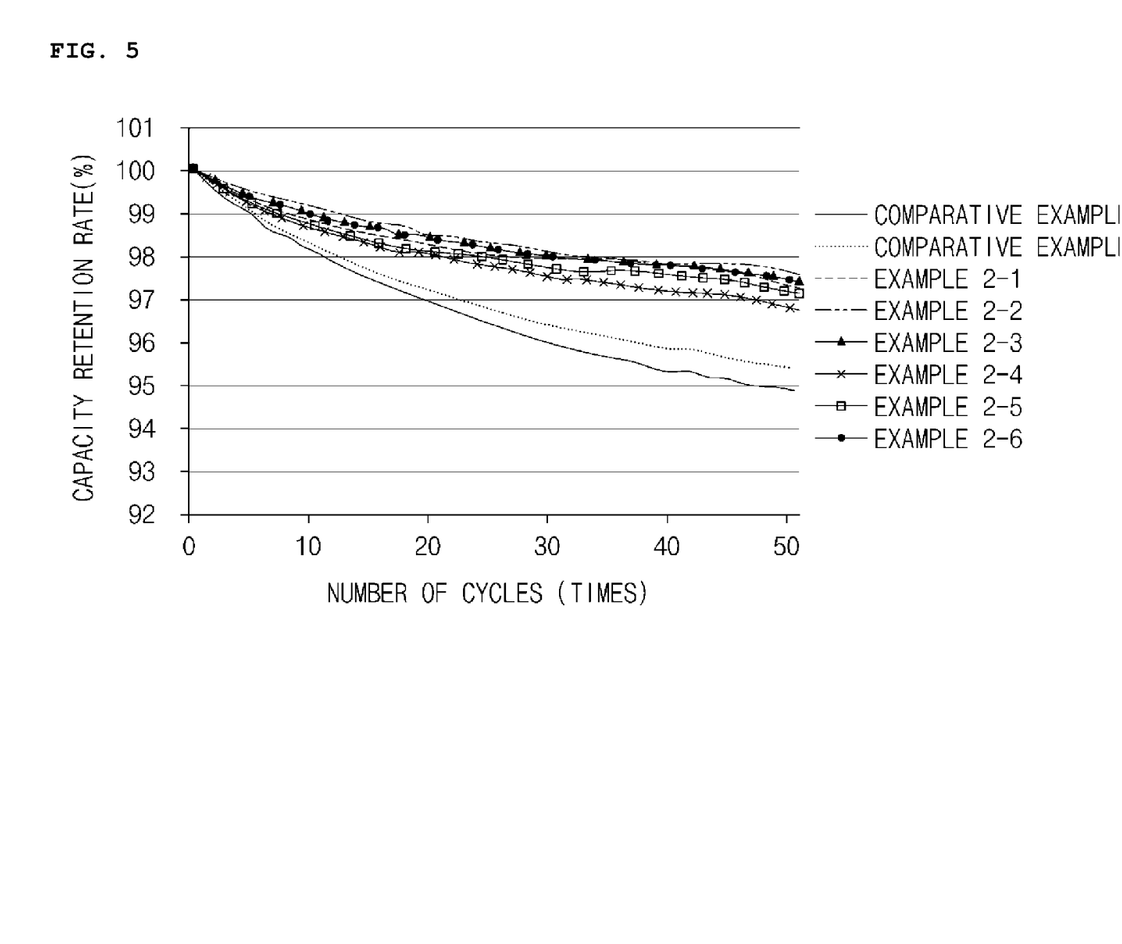
FIG. 5 is a graph showing a cycle property of lithium secondary batteries manufactured in Examples 2-1 to 2-6 and Comparative Examples 2-1 and 2-2.

As shown in FIG. 5, it was identified that the lithium secondary batteries including the positive electrode active materials of Examples 1-1 to 1-6 forming a coating layer using a nanosol (Examples 2-1 to 2-6) exhibited a significantly improved cycle property compared to the lithium secondary batteries including the active material of Comparative Example 1-1, which did not form a surface coating layer, and the active material of Comparative Example 1-2 forming a coating layer according to a common dry mixing method (Comparative Examples 2-1 and 2-2).

In detail, it was identified that the battery of Comparative Example 2-1 including the positive electrode active material of Comparative Example 1-1, which did not form a YSZ coating layer on the $LiNi_{0.6}Mn_{0.2}Co_{0.2}O_2$ oxide surface, experienced great capacity decline as the number of battery cycles increased. In addition, when a YSZ coating layer was formed on the $LiNi_{0.6}Mn_{0.2}Co_{0.2}O_2$ oxide surface, the battery of Example 2-1 including the positive electrode active material of Example 1-1 having uniformly coated YSZ nanoparticles experienced smaller capacity decline compared to the battery of Comparative Example 2-2 including the positive electrode active material of Comparative Example 1-2 having non-uniformly coated YSZ.

From such results, it was identified that a lithium secondary battery including a positive electrode active material having a uniformly formed coating layer of a ceramic-based ion conductor on a $LiNi_{0.6}Mn_{0.2}Co_{0.2}O_2$ oxide surface according to the preparation method of the present invention minimized capacity decline, and as a result, exhibited a more superior cycle property.

What is claimed is:

1. A method for preparing a positive electrode active material comprising mixing lithium complex metal oxide particles with a nanosol of a ceramic-based ion conductor and heat treating the resultant to form a coating layer including the ceramic-based ion conductor on the lithium complex metal oxide particles, and wherein the nanosol of the ceramic-based ion conductor is prepared by dissolving and reacting a precursor of a metal for forming a ceramic-based ion conductor in a glycol-based solvent, and then adding water thereto, the method further comprising a process of heat treatment at a temperature from 120° C. to a boiling point of a glycol-based solvent after dissolving the precursor of the metal for forming a ceramic-based ion conductor and prior to adding water.

2. The method for preparing a positive electrode active material of claim 1, wherein the ceramic-based ion conductor includes any one or a mixture of two or more selected from the group consisting of zirconia-based ceramic, ceria-based ceramic, lanthanum-based ceramic, and cermets thereof.

3. The method for preparing a positive electrode active material of claim 1, wherein the ceramic-based ion conductor includes any one or a mixture of two or more selected from the group consisting of yttria-stabilized zirconia, gadolinia-doped ceria, samarium-doped ceria, lanthanum strontium cobalt ferrite, lanthanum strontium gallate magnesite, lanthanum strontium manganite, calcia-stabilized zirconia, scandia-stabilized zirconia, and nickel-yttria-stabilized zirconia cermet.

4. The method for preparing a positive electrode active material of claim 1, wherein the ceramic-based ion conductor includes any one or a mixture of two or more selected from the group consisting of yttria-stabilized zirconia, calcia-stabilized zirconia, gadolinia-doped ceria, lanthanum strontium gallate magnesite and scandia-stabilized zirconia.

5. The method for preparing a positive electrode active material of claim 4, wherein the yttria-stabilized zirconia is $Zr_{(1-x)}Y_xO_{2-x/2}$ ($0.01 \leq x \leq 0.30$).

6. The method for preparing a positive electrode active material of claim 4, wherein the calcia-stabilized zirconia includes CaO in 1 mol % to 20 mol % to the total weight of the calcia-stabilized zirconia.

7. The method for preparing a positive electrode active material of claim 4, wherein the scandia-stabilized zirconia includes any one or a mixture of two or more selected from the group consisting of $(ZrO_2)_{1-2x}(Sc_2O_3)_x$, $(ZrO_2)_{1-2x}(Sc_2O_3)_{x-z}(Y_2O_3)_z$ and $(ZrO_2)_{1-2x-z}(Sx_2O_3)_x(CeO_2)_z$ ($0.01 \leq x \leq 0.2$ and $0.01 \leq z \leq 0.1$).

8. The method for preparing a positive electrode active material of claim 1, wherein the ceramic-based ion conductor is noncrystalline.

9. The method for preparing a positive electrode active material of claim 1, wherein the ceramic-based ion conductor has a hydroxide form.

10. The method for preparing a positive electrode active material of claim 1, wherein the ceramic-based ion conductor has an average particle diameter ($D_{50}$) of 1 nm to 100 nm.

11. The method for preparing a positive electrode active material of claim 1, wherein the nanosol of a ceramic-based ion conductor uses the ceramic-based ion conductor in an amount to have the content of 50 ppm to 300,000 ppm to the total weight of the positive electrode active material.

12. The method for preparing a positive electrode active material of claim 1, wherein the nanosol of a ceramic-based ion conductor further includes any one, two or more metals selected from the group consisting of aluminum (Al), niobium (Nb), titanium (Ti), tungsten (W), molybdenum (Mo), chromium (Cr), copper (Cu), vanadium (V) and zinc (Zn), or is mixed and used with a nanosol including the metal.

13. The method for preparing a positive electrode active material of claim 1, wherein the heat treatment is carried out in a temperature range of 100° C. to 600° C.

14. A positive electrode active material prepared using the preparation method of claim 1, comprising:
   lithium complex metal oxide particles; and
   a coating layer located on the lithium complex metal oxide particles,
   wherein the coating layer includes a ceramic-based ion conductor.

15. The positive electrode active material of claim 14, wherein the lithium complex metal oxide comprises a compound of the following Chemical Formula 1:

$$Li_{1+a}Ni_{1-b-c}Mn_bCo_cO_2 \qquad \text{<Chemical Formula 1>}$$

wherein, in Chemical Formula 1, $0 \leq a \leq 0.33$, $0 \leq b \leq 0.5$ and $0 \leq c \leq 0.5$.

16. The positive electrode active material of claim 14, wherein the ceramic-based ion conductor has a single phase peak in an X-ray analysis.

17. The positive electrode active material of claim 14, wherein the coating layer further includes a metal oxide including any one selected from the group consisting of Al, Nb, Ti, W, Mo, Cr, Cu, V and Zn, or two or more types of metals among these.

18. The positive electrode active material of claim 14, which has an average particle diameter ($D_{50}$) of 3 μm to 25 μm.

* * * * *